US012807506B2

(12) United States Patent
Kaushal et al.

(10) Patent No.: US 12,807,506 B2
(45) Date of Patent: Nov. 24, 2026

(54) METHOD FOR RECOVERY OF METAL OXIDES/CARBONATES FROM ASSORTED WASTE LI-ION BATTERIES

(71) Applicants: THE SECRETARY, MINISTRY OF ELECTRONICS AND INFORMATION TECHNOLOGY, GOVT. OF INDIA, New-Delhi (IN); THE DIRECTOR GENERAL, CENTRE FOR MATERIALS FOR ELECTRONICS TECHNOLOGY (C-MET), Pune (IN)

(72) Inventors: Ajay Kaushal, Pune (IN); Amit Barnwal, Pune (IN); Rajesh Kumar Siva Sankaran Nair, Pune (IN); Ratheesh Ravendran, Pune (IN); Sandip Chatterjee, New-Delhi (IN)

(73) Assignees: THE SECRETARY, MINISTRY OF ELECTRONICS AND INFORMATION TECHNOLOGY, GOVT. OF INDIA, New-Delhi (IN); THE DIRECTOR GENERAL, CENTRE FOR MATERIALS FOR ELECTRONICS TECHNOLOGY (C-MET), Pune (IN)

( * ) Notice: Subject to any disclaimer, the term of this patent is extended or adjusted under 35 U.S.C. 154(b) by 720 days.

(21) Appl. No.: 18/204,518

(22) Filed: Jun. 1, 2023

(65) Prior Publication Data

US 2023/0391632 A1 Dec. 7, 2023

(30) Foreign Application Priority Data

Jun. 1, 2022 (IN) ............................ 202211031488

(51) Int. Cl.
*C01D 15/08* (2006.01)
*C22B 15/00* (2006.01)
*C22B 21/00* (2006.01)
*H01M 10/54* (2006.01)

(52) U.S. Cl.
CPC .......... *C01D 15/08* (2013.01); *C22B 15/0004* (2013.01); *C22B 15/001* (2013.01); *C22B 21/0007* (2013.01); *C22B 21/0069* (2013.01); *H01M 10/54* (2013.01)

(58) Field of Classification Search
None
See application file for complete search history.

(56) References Cited

U.S. PATENT DOCUMENTS

| | | | | |
|---|---|---|---|---|
| 11,961,980 | B2 * | 4/2024 | Arakawa | C22B 23/0415 |
| 12,084,742 | B2 * | 9/2024 | Okajima | C22B 7/005 |
| 2011/0135547 | A1 * | 6/2011 | Kobayashi | C22B 3/44 423/139 |
| 2019/0152797 | A1 * | 5/2019 | Liu | B01D 9/0031 |
| 2020/0044295 | A1 * | 2/2020 | Arakawa | C22B 23/00 |
| 2022/0045375 | A1 * | 2/2022 | Goda | H01M 4/505 |

FOREIGN PATENT DOCUMENTS

JP 7232119 B2 * 3/2023

OTHER PUBLICATIONS

CN 106450542; Feb. 22, 2017.*
JP 7232119; Mar. 2, 2023.*

* cited by examiner

*Primary Examiner* — Guinever S Gregorio
(74) *Attorney, Agent, or Firm* — Rothwell, Figg, Ernst & Manbeck, P.C.

(57) ABSTRACT

The present disclosure relates to a method for recovery of metal oxides/carbonates from assorted waste Li-ion batteries. The method uses less solvent and has a high extraction efficiency. Further, the method requires comparatively lesser extraction time to extract metals. Furthermore, the method of the present disclosure is cost-effective.

14 Claims, No Drawings

METHOD FOR RECOVERY OF METAL OXIDES/CARBONATES FROM ASSORTED WASTE LI-ION BATTERIES

CROSS REFERENCE TO RELATED APPLICATIONS

This application claims the benefit of priority to Indian Patent application no. 202211031488, filed Jun. 1, 2022, the contents of which are all incorporated herein by reference in their entirety.

FIELD

The present disclosure relates to a method for recovery of metal oxides/carbonates from assorted waste Li-ion batteries.

DEFINITIONS

As used in the present disclosure, the following terms are generally intended to have the meaning as set forth below, except to the extent that the context in which they are used indicates otherwise.

Lithium-Ion Battery: The term 'lithium-ion battery' also known as Li-ion battery is a type of rechargeable battery in which lithium ions move from the negative electrode through an electrolyte to the positive electrode during discharge and back, when charging. Li-ion batteries use an intercalated lithium compound as the material at the positive electrode and typically graphite at the negative electrode.

Brine Solution: The term 'brine solution' refers to a concentrated solution of salt in water. It can be any solution of a salt in water e.g., potassium chloride brine, sodium chloride brine, and the like.

BACKGROUND

The background information herein below relates to the present disclosure but is not necessarily prior art.

Waste Lithium-Ion Batteries (LIBs) include active cathode and anode material which contains plenty of valuable metals, such as cobalt (Co), nickel (Ni), manganese (Mn), and lithium (Li). Research has been focused on the recovery of valuable metal contents from selective type of batteries, whereas the effective recovery of valuable metal from assorted LIBs is limited.

Conventionally, solvent extraction processes are applied to selectively extract the individual metal contents with high purity. More than three steps are required during solvent extraction in the conventional process for selective extraction of metals contents i.e. Li, Co, Ni, and Mn present in the waste LIBs. The maximum number of extraction steps are required when the maximum number of metals present in the waste LIBs. In addition, each extraction step requires further scrubbing steps for purifications which in turn increases the number of extraction stages as well as the cost of the recovery process.

Further, the extraction time taken using the organic extractants/solvents are comparatively very high. The high time in the solvent extraction leads to difficulty in automation and plant scale operations. The Li content is recovered mostly in the final stages of recovery process because of the high solubility of lithium salt resulting in less extraction efficiency.

There is, therefore, felt a need to provide method for recovery of metal oxides/carbonates from assorted waste lithium-ion batteries that mitigates the drawbacks mentioned hereinabove or at least provide useful alternative.

OBJECTS

Some of the objects of the present disclosure, which at least one embodiment herein satisfies, are as follows:

An object of the present disclosure is to ameliorate one or more problems of the prior art or to at least provide a useful alternative.

Another object of the present disclosure is to provide a method for recovery of metal oxides/carbonates from assorted waste Li-ion batteries.

Still another object of the present disclosure is to provide a method for recovery of metal oxides/carbonates from assorted waste Li-ion batteries which requires lesser solvent extraction steps.

Another object of the present disclosure is to provide a method for recovery of metal oxides/carbonates from assorted waste Li-ion batteries that has a high extraction efficiency.

Yet another object of the present disclosure is to provide a method for recovery of metal oxides/carbonates from assorted waste Li-ion batteries which requires comparatively less extraction time to extract metals.

Another object of the present disclosure is to provide a simple and cost-effective method for recovery of metal oxides/carbonates from assorted waste Li-ion batteries.

Other objects and advantages of the present disclosure will be more apparent from the following description, which is not intended to limit the scope of the present disclosure.

SUMMARY

The present disclosure relates to a method for recovering metal oxides/carbonates from assorted waste Li-ion batteries.

The method comprises neutralizing the assorted waste Li-ion batteries by dipping it in a brine solution for a first predetermined time period to obtain neutralized batteries. The neutralized batteries are treated mechanically to obtain a first black mass having a predetermined particle size. The first black mass is separated by screening through a sieve having a predetermined screen size to obtain aluminum (Al) and copper (Cu) fractions and a second black mass. The second black mass is reduced by a carbo-thermal treatment at a first predetermined temperature for a second predetermined time period to obtain a first mixture.

Water is added to the first mixture followed by mixing to obtain a solution comprising lithium carbonate ($Li_2CO_3$) and a first residual mass. The lithium carbonate ($Li_2CO_3$) is separated from the solution by crystallization to obtain a crystallized lithium carbonate ($Li_2CO_3$) and a separated first residual mass. The separated first residual mass is leached by treating it with at least one first mineral acid in the presence of an oxidizing agent at a second predetermined temperature at a predetermined speed to obtain a second mixture containing iron sulfate and a first aqueous phase. The first aqueous phase is separated from the second mixture to obtain a separated iron sulfate and a separated first aqueous phase. The separated first aqueous phase is mixed with a first fluid medium to obtain a first biphasic mixture comprising a second aqueous phase containing cobalt (Co) and nickel (Ni), and a first organic phase containing manganese (Mn). The first organic phase containing manganese (Mn) is separated from the first biphasic mixture to obtain a separated first organic phase containing manganese (Mn) and a separated second aqueous phase containing cobalt (Co) and nickel (Ni). Manganese (Mn) is separated from the organic phase by stripping it with at least one second mineral acid to obtain an acid solution containing manganese (Mn) and a first filtrate. The acid solution containing manganese (Mn) is precipitated to obtain manganese dioxide ($MnO_2$). The separated second aqueous phase containing cobalt (Co) and nickel (Ni) obtained is mixed with a second fluid medium to obtain a second biphasic mixture comprising a third aqueous phase containing nickel (Ni) and a second organic phase containing cobalt (Co). The second organic phase containing cobalt (Co) is separated from the second biphasic mixture to obtain a separated third aqueous phase containing nickel (Ni) and a separated second organic phase containing cobalt (Co). Cobalt (Co) is separated from the second organic phase by stripping it with at least one third mineral acid to obtain an acid solution containing cobalt (Co) and a second filtrate. The acid solution containing cobalt (Co) is precipitated to obtain cobalt oxide ($Co_3O_4$). The separated third aqueous phase containing nickel (Ni) is mixed with oxalic acid to obtain an acidic solution containing nickel oxalate. The acid solution containing nickel oxalate is precipitated followed by heating at a temperature in the range of 800° C. to 1000° C. to obtain nickel oxide (NiO ).

DETAILED DESCRIPTION

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms “a,” “an,” and “the” may be intended to include the plural forms as well, unless the context clearly suggests otherwise. The terms “comprises,” “comprising,” “including,” and “having,” are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

As used herein, the term “and/or” includes any and all combinations of one or more of the associated listed elements.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Conventionally, solvent extraction processes are applied to selectively extract the individual metal contents with high purity. More than three steps of solvent extractions are required in the conventional processes for selective extraction of metals contents i.e. Li, Co, Ni, and Mn present in the waste LIBs. The maximum number of extraction is required when the maximum number of metals present in the waste LIBs. In addition, each extraction steps requires further scrubbing steps for purifications which in turn increases the number of extraction stages as well as the cost of the recovery process.

Further, the extraction time required for the metal extraction are comparatively very high. The high time in the solvent extraction leads to difficulty in automation and plant scale operations. Moreover, the Li content is recovered mostly in the final stages of recovery process because of the high solubility of lithium salt resulting in less extraction efficiency.

The present disclosure relates to a method for recovering metal oxides/carbonates from assorted waste Li-ion batteries.

The method for recovering metal oxides/carbonates from assorted waste Li-ion batteries is described below in detail:

Firstly, assorted waste Li-ion batteries are neutralized by dipping it in a brine solution for a first predetermined time period to obtain neutralized batteries.

In accordance with an embodiment of the present disclosure, the assorted waste Li-ion batteries are at least one selected from the group consisting of lithium nickel manganese cobalt oxides (NMC), lithium nickel cobalt aluminum oxides (NCA), lithium cobalt oxide (LCO), and lithium manganese oxide (LMO).

In accordance with an embodiment of the present disclosure, the first predetermined time period is in the range of 3 hours to 5 hours. In an exemplary embodiment, the first predetermined time period is 4 hours.

The neutralized batteries are treated mechanically to obtain a first black mass having a predetermined particle size.

In accordance with an embodiment of the present disclosure, the step of mechanical treatment includes shredding, crushing, hammer milling, disc milling, cutting milling, and ball milling. In an exemplary embodiment, the step of mechanical treatment includes shredding.

In accordance with an embodiment of the present disclosure, the predetermined particle size is in the range of 1 μm to 100 μm. In an exemplary embodiment, the predetermined particle size is 100 μm.

The first black mass is separated by screening through a sieve having a predetermined screen size to obtain aluminum (Al) and copper (Cu) fractions and a second black mass.

In accordance with an embodiment of the present disclosure, the predetermined screen size is in the range of 50 μm to 500 μm. In an exemplary embodiment, the predetermined screen size is 100 μm.

The second black mass is reduced by a carbo-thermal treatment at a first predetermined temperature for a second predetermined time period to obtain a first mixture.

In accordance with an embodiment of the present disclosure, the first predetermined temperature is in the range of 600° C. to 900° C. In an exemplary embodiment, the first predetermined temperature is 750° C.

In accordance with an embodiment of the present disclosure, the second predetermined time period is in the range of 30 minutes to 120 minutes. In an exemplary embodiment, the second predetermined time period is in the range of minutes.

Water is added to the first mixture followed by mixing to obtain a solution comprising lithium carbonate ($Li_2CO_3$) and a first residual mass.

The lithium carbonate ($Li_2CO_3$) is separated from the solution by crystallization to obtain a crystallized lithium carbonate ($Li_2CO_3$) and a separated first residual mass. The so obtained crystallized lithium carbonate ($Li_2CO_3$) has a purity more than 99%. More than 98% of an extraction efficiency of the crystallized lithium carbonate ($Li_2CO_3$) is obtained.

In accordance with the present disclosure, the method ascertains the recovery of Li content in the first place which enhances the selective extraction efficiency of Co, Mn, and Ni content in subsequent stages. The Li recovery in the first place prior to Co, Mn, and Ni extraction reduces the solvent extraction steps and increases the extraction efficiency. The method of the present disclosure is fast and cost effective as compared to conventional methods. The recovered material from diverse Li-ion batteries in the present disclosure can be used as starting precursors for the synthesis of different cathode compositions of Li-ion batteries.

The separated first residual mass is leached by treating it with at least one first mineral acid in the presence of an oxidizing agent at a second predetermined temperature at a predetermined speed to obtain a second mixture containing iron sulfate and a first aqueous phase.

In accordance with an embodiment of the present disclosure, the first mineral acid is at least one selected from the group consisting of sulphuric acid ($H_2SO_4$), nitric acid ($HNO_3$), hydrochloric acid (HCl), and hydrofluoric acid (HF). In an exemplary embodiment, the first mineral acid is sulphuric acid ($H_2SO_4$).

In accordance with an embodiment of the present disclosure, the oxidizing agent is at least one selected from the group consisting of hydrogen peroxide ($H_2O_2$), sodium persulphate ($Na_2S_2O_8$), ammonium persulphate ($(NH_4)_2S_2O_8$), and sodium chlorate ($NaClO_3$). In an exemplary embodiment, the oxidizing agent is hydrogen peroxide ($H_2O_2$).

In accordance with an embodiment of the present disclosure, the second predetermined temperature is in the range of 70° C. to 90° C. In an exemplary embodiment, the second predetermined temperature is 80° C.

In accordance with an embodiment of the present disclosure, the predetermined speed is in the range of 200 rpm to 300 rpm. In an exemplary embodiment, the predetermined speed is 250 rpm.

The first aqueous phase is separated from the second mixture to obtain a separated iron sulfate and a separated first aqueous phase.

The separated first aqueous phase is mixed with a first fluid medium to obtain a first biphasic mixture comprising a second aqueous phase containing cobalt (Co) and nickel (Ni), and a first organic phase containing manganese (Mn).

In accordance with an embodiment of the present disclosure, the first fluid medium is at least one selected from the group consisting of di-(2-ethylhexyl)-phosphoric acid (D2EHPA), 2-ethylhexyl phosphonic acid mono-2-ethylhexyl ester (PC88A), bis (2,2,4 trimethylpentyl) phosphinic acid (Cyanex 272) and 2-ethylhexyl hydrogen-2-ethylhexyl phosphonate.

In accordance with an embodiment of the present disclosure, the first fluid medium is a combination of di-(2-ethylhexyl)-phosphoric acid and at least one first diluent in a ratio in the range of 1:3 to 1:8. In an exemplary embodiment, the first fluid medium is a combination of di-(2-ethylhexyl)-phosphoric acid and the first diluent in a ratio of 1:5.

In accordance with an embodiment of the present disclosure, the first diluent is at least one selected from the group consisting of kerosene, benzene, toluene, and xylene. In an exemplary embodiment, the first diluent is kerosene.

The first organic phase containing manganese (Mn) is separated from the first biphasic mixture to obtain a separated first organic phase containing manganese (Mn) and a separated second aqueous phase containing cobalt (Co) and nickel (Ni).

Manganese (Mn) from the organic phase is separated by stripping it with at least one second mineral acid to obtain an acid solution containing manganese (Mn) and a first filtrate.

In accordance with an embodiment of the present disclosure, the second mineral acid is at least one selected from the group consisting of sulphuric acid ($H_2SO_4$), nitric acid ($HNO_3$), hydrochloric acid (HCl), and hydrofluoric acid (HF). In an exemplary embodiment, the second mineral acid is sulphuric acid ($H_2SO_4$).

The acid solution containing manganese (Mn) is precipitated to obtain manganese dioxide ($MnO_2$).

In an embodiment, the acid solution containing manganese (Mn) is precipitated to manganese hydroxide ($Mn(OH)_2$) by using the base medium with at least one of sodium hydroxide (NaOH) and potassium hydroxide (KOH). The precipitates are heated at a temperature in the range of 500° C. to 900° C. to obtain manganese dioxide ($MnO_2$). The so obtained manganese dioxide ($MnO_2$) has a purity more than 99%. More than 99% of an extraction efficiency of manganese dioxide ($MnO_2$) is obtained.

The separated second aqueous phase containing cobalt (Co) and nickel (Ni) is mixed with a second fluid medium to obtain a second biphasic mixture comprising a third aqueous phase containing nickel (Ni) and a second organic phase containing cobalt (Co).

In accordance with an embodiment of the present disclosure, the second fluid medium is at least one selected from the group consisting of 2-ethylhexyl hydrogen-2-ethylhexyl phosphonate (PC88A), di-(2-ethylhexyl)-phosphoric acid (D2EHPA), bis (2,2,4 trimethylpentyl) phosphinic acid (Cyanex 272) and 2-ethylhexyl hydrogen-2-ethylhexyl phosphonate. In an exemplary embodiment, the second fluid medium is 2-ethylexyl hydrogen-2-ethylhexyl phosphonate (PC88A).

In accordance with an embodiment of the present disclosure, the second fluid medium is a combination of 2-ethylhexyl hydrogen-2-ethylhexyl phosphonate and at least one second diluent in a ratio in the range of 1:1 to 1:5. In an exemplary embodiment, the second fluid medium is a combination of 2-ethylhexyl hydrogen-2-ethylhexyl phosphonate and the second diluent in a ratio of 1:5.

In accordance with an embodiment of the present disclosure, the second diluent is at least one selected from the group consisting of kerosene, benzene, toluene, and xylene. In an exemplary embodiment, the second diluent is kerosene.

In accordance with an embodiment of the present disclosure, the first diluent and the second diluent are same.

In accordance with the present disclosure, the utilization of the first fluid medium and second fluid medium eliminate the extraction of impurities at optimum pH values resulting in high purity of the extracted products.

The second organic phase containing cobalt (Co) is separated from the second biphasic mixture to obtain a separated third aqueous phase containing nickel (Ni) and a separated second organic phase containing cobalt (Co).

Cobalt (Co) is separated from the second organic phase by stripping it with at least one third mineral acid to obtain an acid solution containing cobalt (Co) and a second filtrate.

In accordance with an embodiment of the present disclosure, the third mineral acid is at least one selected from the group consisting of sulphuric acid ($H_2SO_4$), nitric acid ($HNO_3$), hydrochloric acid (HCl), and hydrofluoric acid (HF). In an exemplary embodiment, the third mineral acid is sulphuric acid ($H_2SO_4$).

In accordance with an embodiment of the present disclosure, the first mineral acid, the second mineral acid and the third mineral acid are same.

The acid solution containing cobalt (Co) is precipitated by using oxalic acid to obtain cobalt oxide ($Co_3O_4$).

In an embodiment, the acid solution containing cobalt (Co) is mixed with oxalic acid to obtain precipitates of cobalt oxalate ($CoC_2O_4$). The precipitates of cobalt oxalate ($CoC_2O_4$) are heated at a temperature in the range of 700° C. to 1000° C. to obtain cobalt oxide ($Co_3O_4$). The so obtained cobalt oxide ($Co_3O_4$) has a purity more than 99%. More than 99% of an extraction efficiency of cobalt oxide ($Co_3O_4$) is obtained.

The separated third aqueous phase containing nickel (Ni) is mixed with oxalic acid to obtain an acidic solution containing nickel oxalate.

The acid solution containing nickel oxalate is precipitated followed by heating at a temperature in the range of 800° C. to 1000° C. to obtain nickel oxide (NiO). In an exemplary embodiment, the acid solution containing nickel oxalate is precipitated followed by heating at 900° C. to obtain nickel oxide (NiO). The so obtained nickel oxide (NiO) has a purity more than 99%. More than 98% of an extraction efficiency of nickel oxide (NiO) is obtained.

In accordance with an embodiment of the present disclosure, the so obtained first filtrate and the so obtained second filtrate are regenerated to obtain the first fluid medium and the second fluid medium.

The first fluid medium and the second fluid medium are regenerated after each experiment with 100% efficiency and repeatedly used for continuous extraction experiments. The extracted $Li_2CO_3$, $Co_3O_4$, $MnO_2$, and NiO from assorted waste LIBs with purity higher than 99% which can be used as starting precursors for Lithium-Nickel-Manganese-Cobalt-Oxide (NMC), lithium cobalt oxide battery (LCO), and lithium manganese oxide battery (LMO) based Li-ion battery manufacturing as well as other potential secondary materials for different applications.

In accordance with the present disclosure, the Li, Co, Mn, and Ni contents are recovered from LIB black mass with more than 98% extraction efficiency.

The foregoing description of the embodiments has been provided for purposes of illustration and is not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

Experimental Details

Experiment 1: A method for Recovering Metal Oxides/Carbonates From Assorted Waste Li-Ion Batteries, in Accordance With the Present Disclosure 100 kg of assorted waste Lithium-Ion Batteries (LIBs) were collected and neutralized by dipping in 200 liters of a brine solution for 4 hours. Neutralization of batteries were done which results in the safe destruction of batteries. The neutralized waste batteries were shredded by using shredder with subsequent milling using hammer mill to obtain a first black mass of 45 kg having a particle size of 100 μm. The first black mass was separated through a sieve having a screen size of 100 μm to obtain aluminum (Al) and copper (Cu) fractions and a second black mass having a particle size lower than 100 μm. The separated aluminum (Al) and copper (Cu) fraction were having a particle size higher than 100 μm. The second black mass was reduced by a carbothermal treatment at 750° C. for 90 minutes to obtain a first mixture. The thermal reduction step reduces the Li contents to its carbonates due to the presence of carbon in the black mass from anode component of batteries. 450 liters of water was added to the first mixture followed by mixing to obtain a solution comprising lithium carbonate ($Li_2CO_3$) and a first residual mass. Lithium carbonate ($Li_2CO_3$) was separated from the solution by crystallization to obtain a crystallized lithium carbonate ($Li_2CO_3$) and a separated first residual mass. The crystallized lithium carbonate ($Li_2CO_3$) had a purity higher than 99%. Analysis of recovered metal contents was carried out using inductively coupled plasma—optical emission spectrometry (ICP-OES). Table 1 illustrates the ICP-OES results of different elemental contents present in waste LIBs black mass and calculated extraction efficiency of Li and Fe in first step extraction.

Further, the separated first residual mass comprising Mn, Co, Fe and Ni obtained after Li extraction were subjected to acid leaching. The separated first residual mass was leached by treating it with 400 liters of 3 molar sulphuric acid ($H_2SO_4$) (first mineral acid) in the presence of 40 liters of hydrogen peroxide ($H_2O_2$) (oxidizing agent) at 80° C. under stirring at 250 rpm to obtain a second mixture containing iron sulfate and a first aqueous phase. The first aqueous phase was separated from the second mixture to obtain the iron sulfate and a separated first aqueous phase. The iron sulfate precipitates formed in the second mixture at pH value of 2.5 and are filtered. The separated first aqueous phase was mixed with 500 liters of diluted di-(2-ethylhexyl)-phosphoric acid solution (first fluid medium) to maintain pH of 3 to obtain a first biphasic mixture comprising a second aqueous phase containing cobalt (Co) and nickel (Ni), and a first organic phase containing manganese (Mn). Di-(2-ethylhexyl)-phosphoric acid was mixed with kerosene (first diluent) in ratio of 1:5 to obtain the diluted di-(2-ethylhexyl)-phosphoric acid solution. The first organic phase containing manganese (Mn) was separated from the first biphasic mixture to obtain a separated first organic phase containing manganese (Mn) and a separated second aqueous phase containing cobalt (Co) and nickel (Ni). Manganese (Mn) was separated from the organic phase by stripping using 500 liters of 1 molar $H_2SO_4$ (second mineral acid) to obtain an acid solution containing manganese (Mn) and a first filtrate.

The acid solution containing manganese (Mn) was precipitated to obtain manganese dioxide ($MnO_2$). Table 2 illustrates the ICP-OES results for the extraction efficiency of Mn content using fresh and regenerated fluid medium.

The separated second aqueous phase containing cobalt (Co) and nickel (Ni) was mixed with diluted 2-ethylhexyl hydrogen-2-ethylhexyl phosphonate solution (second fluid medium) to obtain a second biphasic mixture comprising a third aqueous phase containing nickel (Ni) and a second organic phase containing cobalt (Co). 2-ethylhexyl hydrogen-2-ethylhexyl phosphonate solution was mixed with kerosene (second diluent) in ratio of 1:5 to obtain a diluted 2-ethylhexyl hydrogen-2-ethylhexyl phosphonate solution (second fluid medium). The second organic phase containing cobalt (Co) was separated from the second biphasic mixture to obtain a separated third aqueous phase containing nickel (Ni) and a separated second organic phase containing cobalt (Co). Cobalt (Co) was separated from the second organic phase by stripping with 450 liters of oxalic acid to obtain an acid solution containing cobalt (Co) and a second filtrate. The acid solution containing cobalt (Co) was precipitated at 90° C. to obtain cobalt oxide ($Co_3O_4$). More than 98% of an extraction efficiency with a purity of 99% of cobalt oxide ($Co_3O_4$) was obtained. The separated third aqueous phase containing nickel (Ni) obtained in step (n) was mixed with 350 liters of oxalic acid to obtain an acidic solution containing nickel oxalate. The acid solution containing nickel oxalate was precipitated at 90° C. to obtain nickel oxide (NiO). The first filtrate and the second filtrate were regenerated to obtain the first fluid medium and the second fluid medium and reused in the process. More than 98% of an extraction efficiency with a purity of 99% of nickel oxide (NiO) was obtained. The Li recovery at first place simplifies and enhances the extraction efficiency in subsequent selective extraction of Co, Mn, and Ni content. Further, the high extraction efficiency of Co, Mn, and Ni content achieved in accordance with the present disclosure was more than 98% and the achieved efficiency was compared with the extraction efficiency observed for processing of as-received black mass (first black mass). The as-received black mass was acid leached for the same optimum parameters as that of the present disclosure to obtain fresh aqueous leachate containing all-metal contents including Al, Cu, Li, Co, Mn, and Ni. All the metal contents present in LIB black mass such as Al, Cu, Li, Co, Mn, and Ni were effectively leached out in the leaching step to obtain a fresh aqueous leachate. Table 3 illustrates the ICP-OES results of various metal contents extracted from aqueous leachate in two-stage solvent extractions by using di-(2-ethylhexyl)-phosphoric acid (first fluid medium). Nearly 94% of Mn was extracted in two stages of solvent extraction along with other metal contents. It is evident from the results that, without any prior treatment of as-received black mass (first black mass), the extraction efficiency for selective metal extraction from black mass cannot be achieved effectively. Also, additional stages of solvent extractions were required in case of as-received black mass (first black mass) to further extract the Mn content with extraction efficiency as high as 98%. In addition, the purity of metal will also be affected as other metal contents were found to be extracted in each selective metal extraction stage. The improved extraction efficiency of more than 98% in selective recovery of Co, Mn, and Ni can be achieved in accordance with present disclosure by reducing the number of solvent extraction steps by virtue of initial Li separation. The Li recovery at first place after black mass treatment simplified and enhanced the extraction efficiency in subsequent selective extraction of valuable Co, Mn, and Ni content.

TABLE 1

ICP-OES results of different elemental contents and calculated Li and Fe extraction efficiency in a first step extraction.

| | Al (%) | Cu (%) | Li (%) | Co (%) | Fe (%) | Mn (%) | Ni (%) |
|---|---|---|---|---|---|---|---|
| First black mass | 3.63 | 5.38 | 4.29 | 17.36 | 0.7 | 8.83 | 1.98 |
| Second black mass | 0.12 | 0.16 | 4.65 | 23.74 | 1.2 | 9.26 | 2.19 |
| First mixture | 0.09 | 0.11 | 4.76 | 25.01 | 1.2 | 9.67 | 2.23 |
| First residual mass | 0.01 | 0.02 | 0.08 | 27.74 | 1.4 | 10.51 | 2.34 |
| Li extraction efficiency (%) | NA | NA | 98.31 | NA | NA | NA | NA |
| Fe extraction efficiency (%) | NA | NA | NA | NA | 98.57 | NA | NA |

It is evident from Table 1 that the Al and Cu metal content reduces from the corresponding 3.63% and 5.38%, respectively present in as received black mass to 0.12% and 0.16%, respectively after mechanical processing. Table 1 also reveals the high extraction efficiency of Li to higher than 98% achieved after carbothermal reduction step and separation of Fe contents to more than 98% after pH adjustment of the first aqueous solution.

TABLE 2

ICP-OES results for elemental analysis at different solvent extractions with the calculated extraction efficiency (ND—Not Detected, NA—Not Applicable)

| | Stage | Al (%) | Cu (%) | Li (%) | Co (%) | Fe (%) | Mn (%) | Ni (%) |
|---|---|---|---|---|---|---|---|---|
| First aqueous phase | | 0.01 | 0.02 | 0.08 | 28.36 | 0.02 | 11.18 | 2.87 |
| Fresh first | S-1 | ND | ND | 0.05 | 27.19 | ND | 6.35 | 2.79 |
| fluid medium | S-2 | ND | ND | ND | 27.12 | ND | 0.10 | 2.75 |
| Extraction efficiency (%) | | NA | NA | NA | 4.37 | NA | 99.10 | 4.18 |
| Regenerated | S-1 | ND | ND | 0.04 | 27.35 | 0.03 | 6.02 | 2.77 |
| first fluid medium | S-2 | ND | ND | ND | 26.97 | ND | 0.09 | 2.76 |
| Extraction efficiency (%) | | NA | NA | NA | 4.90 | NA | 99.19 | 3.83 |
| Second aqueous phase | | ND | ND | ND | 27.35 | ND | 0.09 | 2.75 |
| Fresh | S-1 | ND | ND | ND | 12.40 | ND | 0.03 | 2.72 |
| second fluid medium | S-2 | ND | ND | ND | 0.33 | ND | ND | 2.67 |
| Extraction efficiency (%) | | NA | NA | NA | 98.79 | NA | NA | 2.90 |
| Regenerated second fluid | S-1 | ND | ND | ND | 11.22 | ND | 0.01 | 2.67 |
| medium | S-2 | ND | ND | ND | 0.15 | ND | ND | 2.65 |
| Extraction efficiency (%) | | NA | NA | NA | 99.45 | NA | NA | 3.63 |
| Third aqueous phase | | ND | ND | ND | 0.07 | ND | 0.01 | 2.77 |

From Table 2, it is evident that the more than 99% of Mn content was successfully extracted in two stage solvent extractions steps by using first fluid medium and results are reproducible with reuse of regenerated fluid medium in extraction processes. Similarly, Co content was successfully extracted to more than 98% extraction efficiency by using second fluid medium with reproducible results achieved on reuse of regenerated fluid medium in successive extraction processes.

TABLE 3

ICP-OES results of elemental values obtained in solvent extractions of as-received black mass (commercial black mass).

| | Stage | Al (%) | Cu (%) | Li (%) | Co (%) | Fe (%) | Mn (%) | Ni (%) |
|---|---|---|---|---|---|---|---|---|
| As received black mass | | 3.63 | 5.38 | 4.29 | 17.36 | 0.7 | 8.83 | 1.98 |
| Fresh first | S-1 | 1.85 | 3.12 | 2.23 | 16.18 | 0.5 | 3.65 | 1.68 |
| fluid medium | S-2 | 1.51 | 2.87 | 2.12 | 15.97 | 0.4 | 0.43 | 1.41 |
| Extraction efficiency (%) | | 58.40 | 46.65 | 50.58 | 8.01 | 42.85 | 95.13 | 28.78 |
| Regenerated first fluid | S-1 | 1.96 | 3.78 | 2.54 | 16.46 | 0.4 | 3.49 | 1.55 |
| medium | S-2 | 1.44 | 3.04 | 2.25 | 16.10 | 0.3 | 0.51 | 1.39 |
| Extraction efficiency (%) | | 60.33 | 43.49 | 47.55 | 7.25 | 57.14 | 94.22 | 29.79 |

From Table 3, it is evident that the extraction efficiency of Mn extracted by using di-(2-ethylhexyl)-phosphoric acid is nearly 94%, however other metal contents were also being extracted along with Mn to a higher extent.

Technical Advancements

The present disclosure described hereinabove has several technical advantages including, but not limited to, the realization of a method for recovery of metal oxides/carbonates from assorted Li-ion waste batteries that:

requires lesser solvent extraction steps;

has a high extraction efficiency;

requires comparatively lesser extraction time to extract metals; and is cost-effective.

Throughout this specification the word "comprise", or variations such as "comprises" or "comprising, will be understood to imply the inclusion of a stated element, integer or step," or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The economy significance details requirement may be called during the examination. Only after filing of this Patent application, the applicant can work publically related to present disclosure product/process/method. The applicant will disclose all the details related to the economic significance contribution after the protection of invention.

The invention claimed is:

1. A method for recovering metal oxides/carbonates from assorted waste Li-ion batteries, said method comprising the following steps:

a. neutralizing said assorted waste Li-ion batteries by dipping it in a brine solution for a time period in the range of 3 hours to 5 hours to obtain neutralized batteries;

b. treating mechanically said neutralized batteries to obtain a first black mass having a particle size in the range of 1 μm to 100 μm;

c. separating said first black mass by screening through a sieve having a size screen size in the range of 50 μm to 500 μm to obtain aluminum (Al), copper (Cu) and a second black mass;

d. reducing said second black mass by a carbo-thermal treatment at a temperature in the range of 600° C. to 900° C. for a time period in the range of 30 minutes to 120 minutes to obtain a first mixture comprising lithium carbonate ($Li_2CO_3$) and a residual mass;

e. adding water to said first mixture followed by mixing to obtain a solution comprising lithium carbonate ($Li_2CO_3$), wherein the lithium carbonate is formed during the carbo-thermal treatment of step (d) and dissolves in the water added in this step, and a first residual mass;

f. filtering said lithium carbonate ($Li_2CO_3$) dissolved solution of step (e) to obtain a filtrate containing lithium carbonate and an insoluble residue comprising the residual black mass; and crystallizing lithium carbonate ($Li_2CO_3$) from the filtrate by heating at a temperature in the range of 40° C. to 80° C.;

g. leaching said separated first residual mass by treating it with at least one first mineral acid in the presence of an oxidizing agent at a temperature in the range of 70° C. to 90° C. at a speed in the range of 100 rpm to 200 rpm to obtain a second mixture containing iron sulfate and a first aqueous phase;

h. separating said first aqueous phase from said second mixture to obtain a separated iron sulfate and a separated first aqueous phase;

i. mixing said separated first aqueous phase with a first fluid medium to obtain a first biphasic mixture comprising a second aqueous phase containing cobalt (Co) and nickel (Ni); and a first organic phase containing manganese (Mn);

j. separating said first organic phase containing manganese (Mn) from said first biphasic mixture to obtain a separated first organic phase containing manganese (Mn) and a separated second aqueous phase containing cobalt (Co) and nickel (Ni);

k. separating manganese (Mn) from said separated organic phase by stripping it with at least one second mineral acid to obtain an acid solution containing manganese (Mn) and a first filtrate comprising spent organic extractant;

l. precipitating said acid solution containing manganese (Mn) to obtain manganese dioxide ($MnO_2$);

m. mixing said separated second aqueous phase containing cobalt (Co) and nickel (Ni) obtained in step (j) with a second fluid medium to obtain a second biphasic mixture comprising a third aqueous phase containing nickel (Ni) and a second organic phase containing cobalt (Co);

n. separating said second organic phase containing cobalt (Co) from said second biphasic mixture to obtain a separated third aqueous phase containing nickel (Ni) and a separated second organic phase containing cobalt (Co);

o. separating cobalt (Co) from said separated second organic phase by stripping it with at least one third mineral acid to obtain an acid solution containing cobalt (Co) and a second filtrate comprising spent organic extractant;

p. precipitating said acid solution containing cobalt (Co) to obtain cobalt oxide ($Co_3O_4$);

q. mixing said separated third aqueous phase containing nickel (Ni) obtained in step (n) with oxalic acid to obtain an acidic solution containing nickel oxalate; and r. precipitating said acid solution containing nickel oxalate followed by heating at a temperature in the range of 800° C. to 1000° C. to obtain nickel oxide (NiO).

2. The method as claimed in claim 1, wherein said first filtrate comprising spent organic extractant obtained in step (k) and said second filtrate comprising spent organic extractant obtained in step (o) are regenerated by stripping and washing to reconstitute said first fluid medium and said second fluid medium, respectively.

3. The method as claimed in claim 1, wherein said assorted waste Li-ion batteries are at least one selected from the group consisting of lithium nickel manganese cobalt oxides (NMC), lithium nickel cobalt aluminum oxides (NCA), lithium cobalt oxide (LCO), and lithium manganese oxide (LMO).

4. The method as claimed in claim 1, wherein said mechanical treatment includes shredding, crushing, hammer milling, disc milling, cutting milling, and ball milling.

5. The method as claimed in claim 1, wherein said Li, Co, Mn, and Ni contents are recovered from LIB black mass with more than 98% extraction efficiency.

6. The method as claimed in claim 1, wherein said crystallized lithium carbonate has a purity more than 99%.

7. The method as claimed in claim 1, wherein said cobalt oxide, manganese dioxide, and nickel oxide have a purity more than 99%.

8. The method as claimed in claim 1, wherein said first mineral acid, said second mineral acid and said third mineral acid are same and are at least one selected from the group consisting of sulphuric acid ($H_2SO_4$), nitric acid ($HNO_3$), hydrochloric acid (HC1), and hydrofluoric acid (HF).

9. The method as claimed in claim 1, wherein said oxidizing agent is at least one selected from the group consisting of hydrogen peroxide ($H_2O_2$), sodium persulphate ($Na{\cdot}_2S_2O_8$), ammonium persulphate ($(NH_4)_2S_2O_8$), and sodium chlorate ($NaClO_3$).

10. The method as claimed in claim 1, wherein said first fluid medium, and said second fluid medium are independently selected from the group consisting of di-(2-ethylhexyl)-phosphoric acid (D2EHPA), 2 ethylhexyl phosphonic acid mono-2-ethylhexyl ester (PC88A), bis (2,2,4 trimethylpentyl) phosphinic acid (Cyanex 272) and 2-ethylhexyl hydrogen-2-ethylhexyl phosphonate.

11. The method as claimed in claim 1, wherein said first fluid medium is a combination of di-(2-ethylhexyl)-phosphoric acid and at least one first diluent in a ratio in the range of 1:3 to 1:8.

12. The method as claimed in claim 11, wherein said first diluent is at least one selected from the group consisting of kerosene, benzene, toluene, and xylene.

13. The method as claimed in claim 1, wherein said second fluid medium a combination of 2-ethylexyl hydrogen-2-ethylhexyl phosphonate and at least one second diluent in a ratio in the range of 1:1 to 1:5.

14. The method as claimed in claim 13, wherein said second diluent is at least one selected from the group consisting of kerosene, benzene, toluene, and xylene.

* * * * *